Sept. 1, 1942. W. A. RAY 2,294,421
VALVE STRUCTURE
Filed March 26, 1940
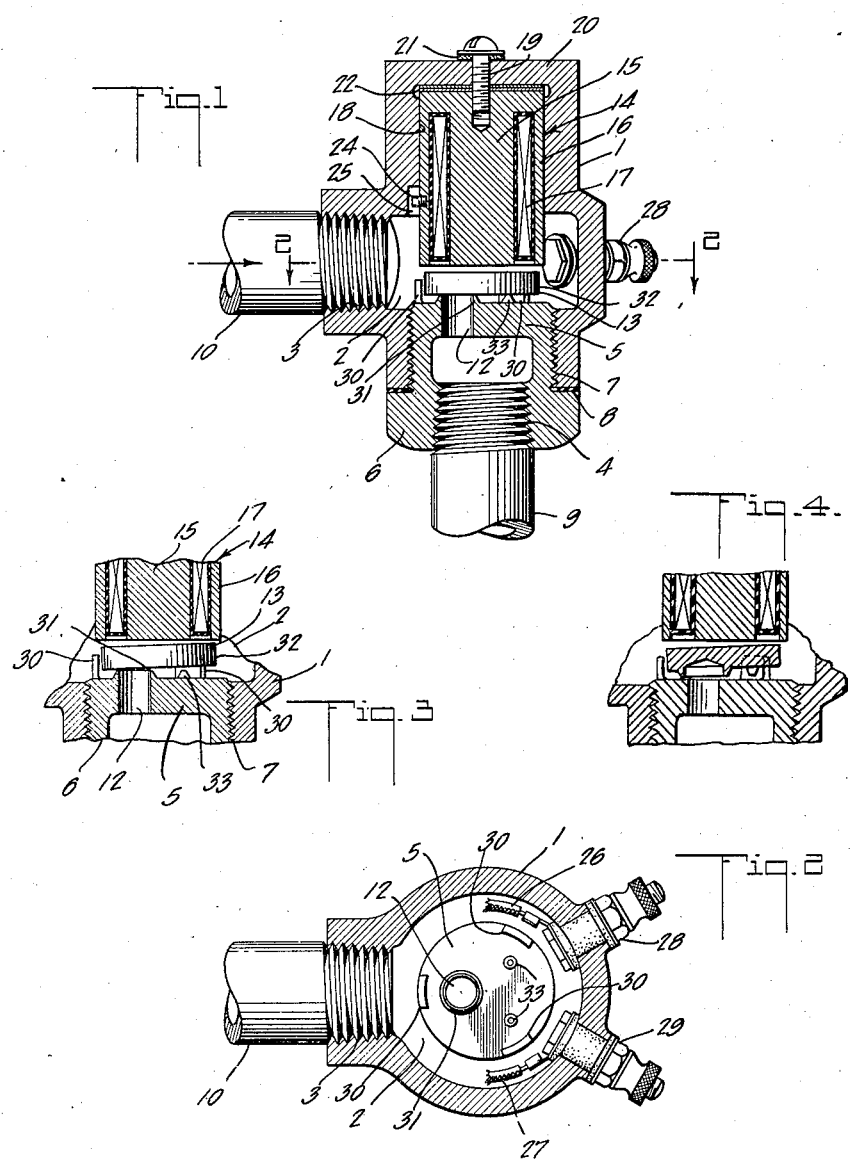
INVENTOR
William A. Ray
BY John Flam
ATTORNEY Patented Sept. 1, 1942

2,294,421

UNITED STATES PATENT OFFICE 2,294,421

VALVE STRUCTURE

William A. Ray, Glendale, Calif.

Application March 26, 1940, Serial No. 326,022

8 Claims. (Cl. 137—139)

This invention relates to valves, and more particularly to valves that are to be opened by the aid of an electromagnet against the pressure of the fluid controlled by the valve.

In many fluid control installations, the available electric power for operating the valve is very small. For example, in safety systems for supplying an explosive fuel, such as gas, to a burner, the valve is caused to open in response to the generation of current by the aid of a thermopile affected by the heat of the main or pilot burner. It has been common to operate a sensitive relay by the thermocurrent, and thus indirectly cause energization of a relatively powerful electromagnet for operating the valve closure.

By the aid of the present invention, the necessity of utilizing an intermediate relay is obviated; instead, the weak thermocurrent may be caused directly to operate the closure member against the fluid pressure.

It is accordingly one of the objects of this invention to make it possible to accomplish these results.

It is still another object of the invention to provide a compact and inexpensive valve of this character.

In the construction of the valve in accordance with this invention, the number of moving parts is reduced to a single one—the valve closure—which is furthermore so arranged that the fitting of it in the valve is a very simple matter. More specifically, the closure is in the form of a loosely mounted disk, requiring accurate machining only insofar as its surfaces are concerned, and obviating the need of bearings or levers or the like.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Figure 1 is an axial section through a valve embodying the invention;

Fig. 2 is a cross sectional view as seen on plane 2—2 of Fig. 1;

Fig. 3 is a fragmentary view similar to Fig. 1 showing the valve partly opened, and Fig. 4 is a fragmentary view similar to Fig. 1 of a modified form of the invention.

Referring to the drawing, the valve comprises a body 1 arranged to form an inlet chamber 2 provided with an inlet opening 3. The body 1 also has an outlet opening 4, separated from the chamber 2 by partition 5. The partition 5 may be formed in body 1 in any convenient way. As shown, the partition 5 is formed by the end wall of a hollow plug 6 which is threadedly secured in the lower end of body 1 as indicated at 7. A suitable gasket or packing 8 is provided to prevent leakage from the inlet chamber 2. Outlet 4 is formed in the plug and is shown as having threads for receiving a conducting pipe 9 which carries the fluid to the place where it is to be used. Inlet 3 is similarly arranged for threaded connection to a pipe or conduit 10 leading from the source of fluid supply. Passage of fluid from the inlet 3 to outlet 4 is permitted by a port 12 which extends through partition 5; port 12 being controlled by a closure member 13.

Closure member 13 is a plain disk of magnetic material, loosely mounted upon partition 5. It is adapted to close port 12 in response to gravity, that is, it is arranged to drop to closing position by its own weight. Means are provided for lifting and maintaining the member above the port, so that fluid can pass freely through it.

Obviously, to lift the closure member 13 from port closing position, it is necessary to overcome the pressure exerted by the controlled fluid on an area equal in extent to the area of the port 12. Since in certain types of valves, the force available for this purpose is very small, means are provided whereby this force is exerted on the closure member 13 so that an effective lever arm is formed to assist in the initial opening or cracking movement of the closure member. This initial movement permits equalization of the pressures acting on the opposite sides of the closure member, after which less force is required to raise the member to full open position. It is thus possible to control fairly high pressures with very small forces.

As a means of raising the closure member 13, an electromagnet 14 is provided in body 1. Magnet 14 is shown as comprising a central core 15 to the upper end of which is joined an outer shell or tube 16. The coil winding 17 is disposed in the annular space formed between core 15 and shell 16. Electromagnet 14 is accommodated in bore 18 provided in body 1 and is supported therein by a screw 19 which threadedly engages the magnet structure and extends through the head 20 of body 1, a suitable sealing washer 21 being provided under the head of the screw 19 to prevent leakage at this point. A number of shims 22 are provided between the magnet and head 20, for a purpose to be presently described. To prevent the magnet structure 14 from turning in the body 1 with screw 19, a pin 24 is provided in shell 16 and arranged to engage a slot 25 formed in the body. Leads 26 and 27 from coil 17 are carried outside the body as by being connected respectively to binding posts 28 and 29 which are suitably insulated from the body 1, and adapted to be connected to a suitable source of current, such as a pilot flame operated thermopile.

It is essential that the clearance between the face of magnet 14 and closure member 13 be quite small when the closure is seated in port closing position, since the available power of the electromagnet 14 is very limited. The magnet structure is therefore arranged to extend a substantial distance into inlet chamber 2. This clearance may be adjusted by varying the number and/or the thickness of shims 22, and is usually of the order of .015 inch.

It will be apparent that upon energization of magnet 14, the closure member 13 will be attracted to it and open port 12. A number of fingers 30 are provided on partition 5 to limit lateral movement of member 13.

It is evident that member 13 must be lifted against the force exerted by the pressure in inlet chamber 2 on member 13. Means are provided whereby the lifting force exerted by the magnet 14 upon the member 13 is rendered sufficient to cause an initial slight unseating of the member 13 which causes a reduction in the force exerted on the member by the controlled fluid, so that the member 13 may be readily lifted by the magnet.

Thus port 12 through the partition 5 is offset from the center of the magnet structure 14 and is provided with a narrow annular seat 31 upon which the member 13 rests when closing the port. Since member 13 is substantially coextensive with the face of magnet 14, it follows that member 13 has an extension or elongation indicated by 32 at one side of seat 31. Upon energization of magnet 14, an equal or symmetrical upward force is exerted over the whole area of member 13. Since the force opposing the upward movement in response to the force exerted by the magnet acts unsymmetrically on member 13 due to the offset of port 12, the member 13 will be tilted on its seat, as shown in Fig. 3. This tilting occurs about a point on seat 31 which is at the left hand end thereof. Accordingly there is a leverage exerted upon member 13, at its right hand portion by the force of the electromagnet 14. There is thus a multiplication of the magnetic force, sufficient to "crack" the valve open against the inlet pressure operating over the area of the port 12.

This tilting may be relatively slight, but it provides a partial opening of port 12, which substantially reduces the force urging member 13 toward its seat, thus enabling the magnet 14 to lift the member entirely from its seat and into engagement with the face of the magnet.

To prevent the weight of the member 13 which urges the member against seat 31 and acts unsymmetrically with respect thereto causing the member to tilt downward and partly open the valve in a manner similar to that in which the magnetic force opens it, a number of pins or projections 33 are provided to support it. Since the lower surface of member 13 is a plane, the tops of pins 33 must lie in the plane of the seat 31.

Although the seat 31 and pins 33 are shown as projecting above the surface of the partition 5, and the lower surface of the closure member 13 is shown as plane, it will be obvious that this arrangement could be interchanged without affecting the functioning of the valve. Thus, the upper surface of partition 5 could be flat, and a seat and pins, similar respectively to 31 and 33 could be formed on the under side of disk 13. Such an arrangement is illustrated in Fig. 4.

What is claimed is:

1. In a valve structure, a valve body having an inlet opening and an outlet opening, as well as a port partition between said openings and having a port therethrough, said partition also having an annular valve seat around the opening and on the inlet side of the body, said inlet side forming a chamber in communication with the inlet opening, an unattached valve closure member at least partly of magnetic material overlying said seat and urged toward its seated position by the pressure of fluid in said chamber, said member having a portion substantially overlapping said seat so as to project considerably beyond said seat, and an electromagnet magnetically influencing said closure member and producing a magnetic force operating upon said projecting portion, said force being asymmetric with respect to the port to cause said member to tilt upon the seat when the electromagnet is energized.

2. In a valve structure, a valve body having an inlet opening and an outlet opening, as well as a partition between said openings, and having a port therethrough, said partition also having an annular valve seat around the opening and on the inlet side of the body, said inlet side forming a chamber in communication with the inlet opening, an unattached valve closure member at least partly of magnetic material overlying said seat and urged toward its seated position by the pressure of fluid in said chamber, said member having a portion substantially overlapping said seat so as to project considerably beyond said seat, said member being substantially entirely clear of the partition except where the member contacts said seat, whereby the fluid pressure affecting said member to urge the member against the seat is effective only over a limited portion of the area of the member, and an electromagnet producing a magnetic force, asymmetric with respect to the port, to tilt said member upon the seat and operating on said projecting portion.

3. In a valve structure, a valve body having an inlet opening and an outlet opening, as well as a partition between said openings, said partition having a port therethrough as well as a raised valve seat of limited area around said port, a freely tiltable unattached closure member at least partly of magnetic material on the inlet side of said partition, said member having a portion projecting beyond said seat, and an electromagnet magnetically influencing said projecting portion and producing a force asymmetrical with respect to the port, to tilt said member upon said seat.

4. In a valve structure, a valve body having a partition forming an inlet chamber, there being an inlet opening to the chamber, as well as an outlet opening, said partition being between said openings and having a port therethrough, as well as a raised valve seat on the inlet side of the partition, unattached closure member at least partly of magnetic material urged toward the seat by the inlet pressure, and an electromagnet in the inlet chamber and having a polar area asymmetric with respect to the port, for affecting the closure member to tilt said member upon said seat.

5. In a valve structure, a valve body having a partition forming an inlet chamber, there being an inlet opening to the chamber, as well as an outlet opening, said partition being between said openings and having a port therethrough, as well as a raised valve seat on the inlet side of the partition, a closure member at least partly of magnetic material urged toward the seat by the inlet pressure, said closure member being unconnected and being free to accommodate itself to the seat under the influence of the fluid pressure, means limiting transverse movement of said member with respect to the seat, and an electromagnet in said inlet chamber for producing a magnet force asymmetric with respect to the port.

6. In a valve structure, a valve body having a partition forming an inlet chamber, there being an inlet opening to the chamber as well as an outlet opening, said partition being between said openings and having a port therethrough, as well as a raised valve seat on the inlet side of the partition, a closure member at least partly of magnetic material in the inlet chamber for cooperation with the seat, means for limiting transverse movement of the member with respect to its seat, said closure member being free to tilt on its seat, an electromagnet in said inlet chamber and having a magnetic frame forming polar areas having an axis displaced from the axis of the port, and operating to cause the closure member to tilt upon its seat.

7. In a valve structure, a valve body having a partition forming an inlet chamber, there being an inlet opening to the chamber as well as an outlet opening, said partition being between said openings and having a port therethrough, as well as a raised valve seat on the inlet side of the partition, a closure member at least partly of magnetic material in the inlet chamber for cooperation with the seat, means for limiting transverse movement of the member with respect to its seat, said closure member being free to tilt on its seat, said limiting means assuring an asymmetric position of the member with respect to the port, and an electromagnet in the inlet chamber and having a magnet frame forming polar areas for producing a magnetic force on the closure member in such manner as to cause said member to tilt off its seat.

8. In a valve structure, a valve body having an inlet opening and an outlet opening, as well as a partition between said openings, and having a port therethrough, said partition also having an annular valve seat around the opening and on the inlet side of the body, said inlet side forming a chamber in communication with the inlet opening, a valve closure member at least partly of magnetic material overlying said seat and urged toward its seated position by the pressure of fluid in said chamber, said member having a portion substantially overlapping said seat so as to project considerably beyond said seat, said member being substantially entirely clear of the partition except where the member contacts said seat, whereby the fluid pressure affecting said member to urge the member against the seat is effective only over a limited portion of the area of the member, an electromagnet producing a magnetic force to tilt said member away from the seat and operating on said projecting portion, said force being asymmetric with relation to the port and a stop spaced from the seat for ensuring that the closure member will properly contact its seat under the influence of the force urging said member against the seat.

WILLIAM A. RAY.